Jan. 4, 1927.
J. D. BRAND
BABY WALKER
Filed April 8, 1926    2 Sheets-Sheet 1
1,613,436
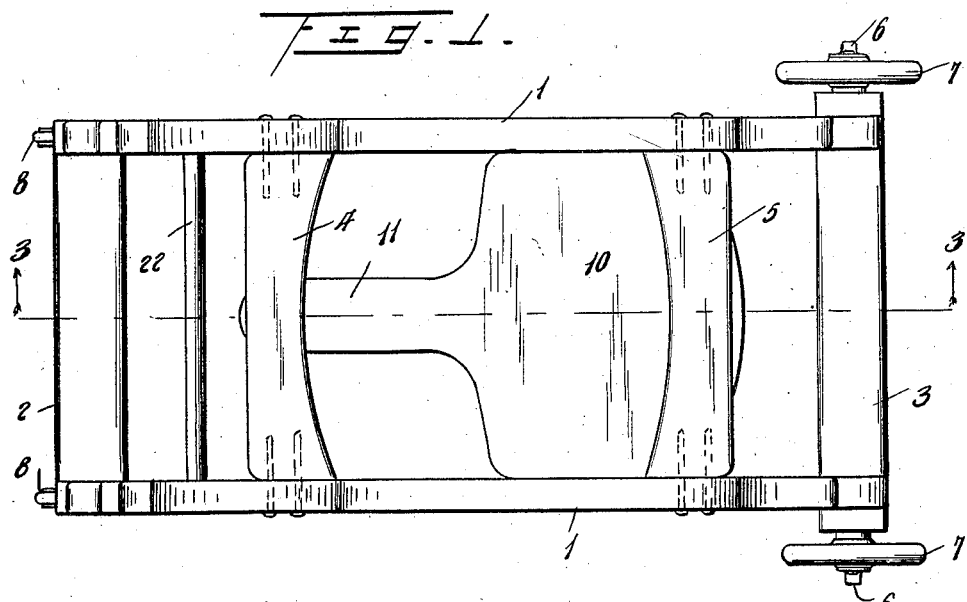
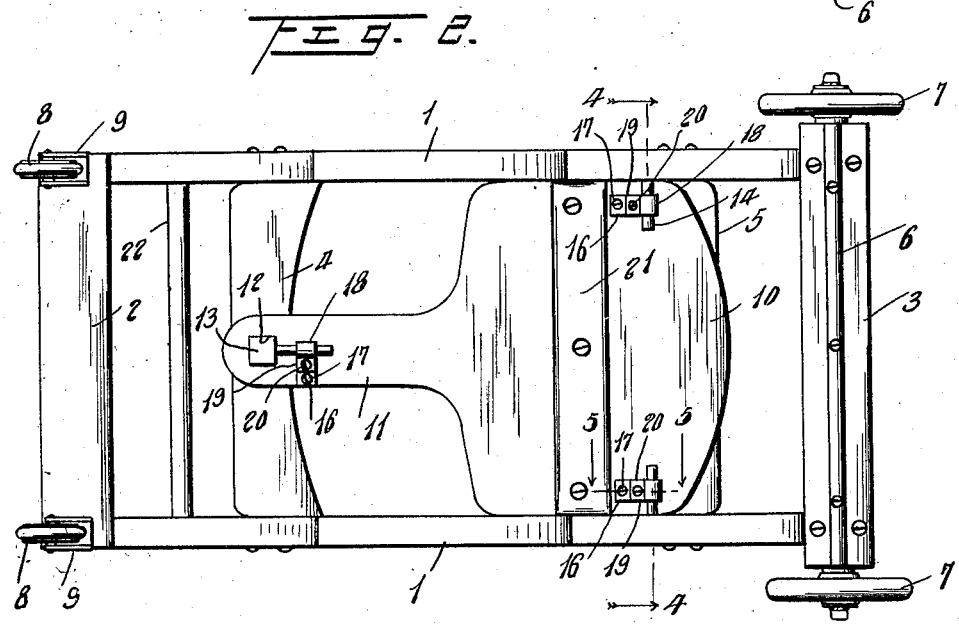
Inventor
J. D. Brand,
By
Attorney Jan. 4, 1927.
J. D. BRAND
1,613,436
BABY WALKER
Filed April 8, 1926     2 Sheets-Sheet 2
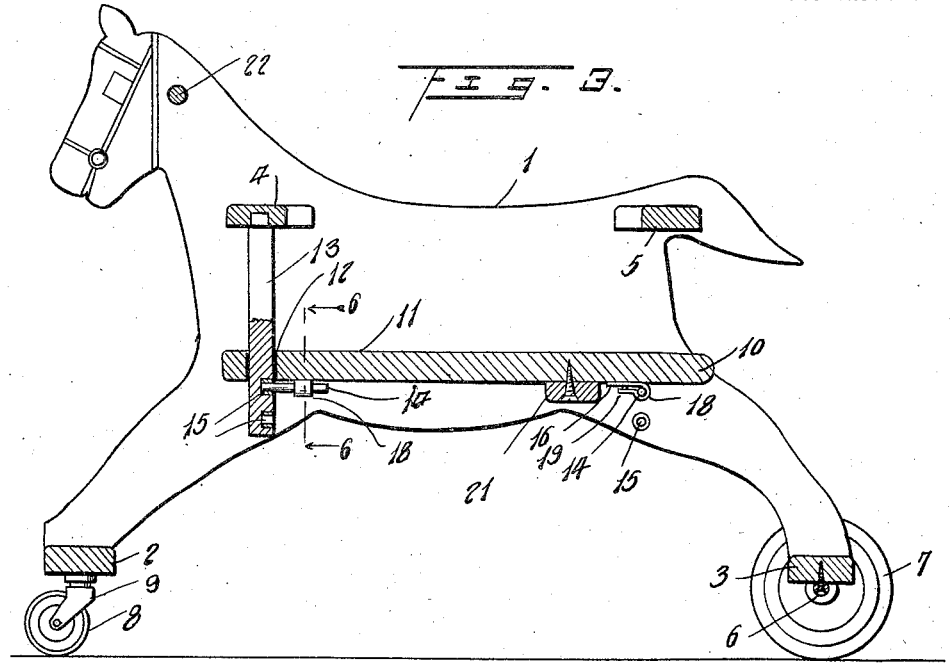
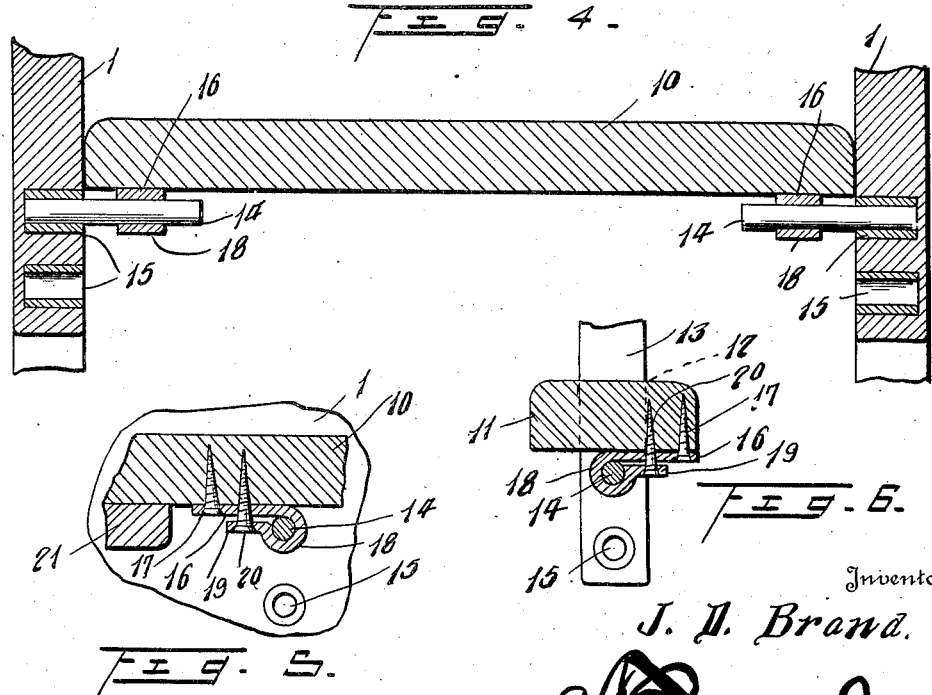
Inventor
J. D. Brand.
By
Attorney Patented Jan. 4, 1927.

1,613,436

UNITED STATES PATENT OFFICE.

JESSE D. BRAND, OF HARTSVILLE, SOUTH CAROLINA.

BABY WALKER.

Application filed April 8, 1926. Serial No. 100,703.

The invention relates to devices of the character generally known as baby walkers, of the type provided with means for supporting the child in an upright position and permitting it to use its legs in walking and at the same time to prevent the child falling.

The invention has for its object the provision of an improved baby walker having for its side members devices resembling animals in motion, said side members being connected by cross members, two of these cross members connecting the feet of the animal on corresponding sides and carrying the wheels or rollers to permit perambulation, while other cross members are arranged near the upper edges of the side members to form an enclosure for the child, a seat also being provided having a forwardly extending tongue to be straddled by the child, the seat being adjustable on the side members by means of pins thereon engaging holes in the side members, and the tongue being slidably mounted on a bar depending from one of the upper cross members and a pin on the tongue engaging one of the series of openings in the bar to support the forward end of the seat and tongue. A hand bar is also provided and connecting the side members in front of the seat.

The invention will be described in detail hereinafter and will be found illustrated in the accompanying drawings, in which—

Figure 1 is a top plan view of the improved baby walker,

Figure 2 is a bottom plan view,

Figure 3 is a longitudinal sectional view on a plane indicated by the line 3—3 of Figure 1, Figure 4 a transverse sectional view on a plane indicated by the line 4—4 of Figure 2, Figure 5 a detail sectional view on a plane indicated by the line 5—5 of Figure 2, and Figure 6 is a detail sectional view on a plane indicated by the line 6—6 of Figure 3.

In the drawings similar reference characters will be used to designate corresponding parts throughout the several views.

The side members 1 of the baby walker are formed to represent animals in motion, the animal selected for illustration in the drawings being a pony or a horse, it being readily understood that so forming the side members will make the article more attractive to the child. The fore and hind legs of the animal represented in the side members are connected by cross members 2 and 3 respectively, while other cross members 4 and 5 connect the side members near their upper edges, said cross members 4 and 5 together with the side members 1 forming an enclosure in which the child will be placed for use of the device.

An axle shaft 6 is secured to the cross member 3 and wheels 7 are journaled on the ends of said axle shaft to support the rear portion of the device. The front wheels 8 are journaled in swivels 9 so as to permit steering the device.

A seat 10 is provided and has a forwardly projecting tongue 11 having an opening 12 to receive a supporting bar 13 depending from the cross member 4. The seat 10 and tongue 11 are adjustably supported on the side members 1 and the supporting bar 13 by means of pins 14 thereon engaging openings 15 in said side members and in the supporting bar 13. Pins 14 are held in engagement with the openings 15 by means of clamping members, shown in detail in Figures 5 and 6, said clamping members comprising a strap of spring steel or other resilient material, designated 16, and secured to the seat 10 or the tongue 11, as the case may be, by means of a driven fastening 17. The strap is then bent into circular form as shown at 18 and has a projecting end 19 that is adapted to be secured to the seat 10 or the tongue 11 by means of another driven fastening 20 engaging said projecting end 19 and through the strap 16 adjacent to the driven member 17. It will be apparent from this description and an inspection of the drawings that as the side members 1 and the supporting bar 13 are provided with series of openings on corresponding planes, that the seat may be raised or lowered to accommodate the child's legs so that he may be required to straddle the tongue 11 at all times when using the device as a walker, and that the pins after they have been engaged in the openings to properly adjust the seat and tongue will be secured to prevent casual displacement thereof by clamping them in the circular portions 18 by turning down on the driven fastening 20, and when it is desired to change the adjustment by releasing the driven fastening 20 the pins may be withdrawn from the openings and the device properly adjusted, after which the pins will again be secured in position as before stated.

21 is a batten secured across the seat 10, and 22 a hand bar to be engaged by the child's hands to assist it in walking.

What is claimed is:—

1. A baby walker, comprising a wheeled frame having spaced side members, cross members connecting said side members, a bar secured to and depending from one of said cross members, and a seat supported by said side members and the bar.

2. A baby walker, comprising a wheeled frame having spaced side members, cross members connecting said side members, a bar secured to and depending from one of said cross members, and a seat adjustably mounted on said side members and on the bar.

3. A baby walker, comprising a wheeled frame having spaced side members, cross members connecting said side members, a bar secured to and depending from one of said cross members, a seat arranged between the side members and having a tongue engaging said bar, and pins on said seat and tongue and adapted to engage in openings in the side members and in the bar.

4. A baby walker, comprising a frame having spaced side members, cross members connecting the lower portions of said side members, a shaft secured to one of said cross members, wheels journaled on said shaft, other wheels rotatably and swivelly mounted on the other cross member, other cross members connecting the upper portions of the side members and forming therewith an enclosure, a bar secured to and depending from one of the last mentioned cross members and having a series of openings therein, the side members also provided with series of openings, a seat arranged between said side members, a tongue on said seat and having an opening receiving said bar, pins on said seat and tongue and adapted to engage the openings in the side members and in the bar, and clamping members secured to said seat and tongue and adapted to hold the pins in engaged positions.

In testimony whereof I affix my signature.

JESSE D. BRAND.